Figure 1:
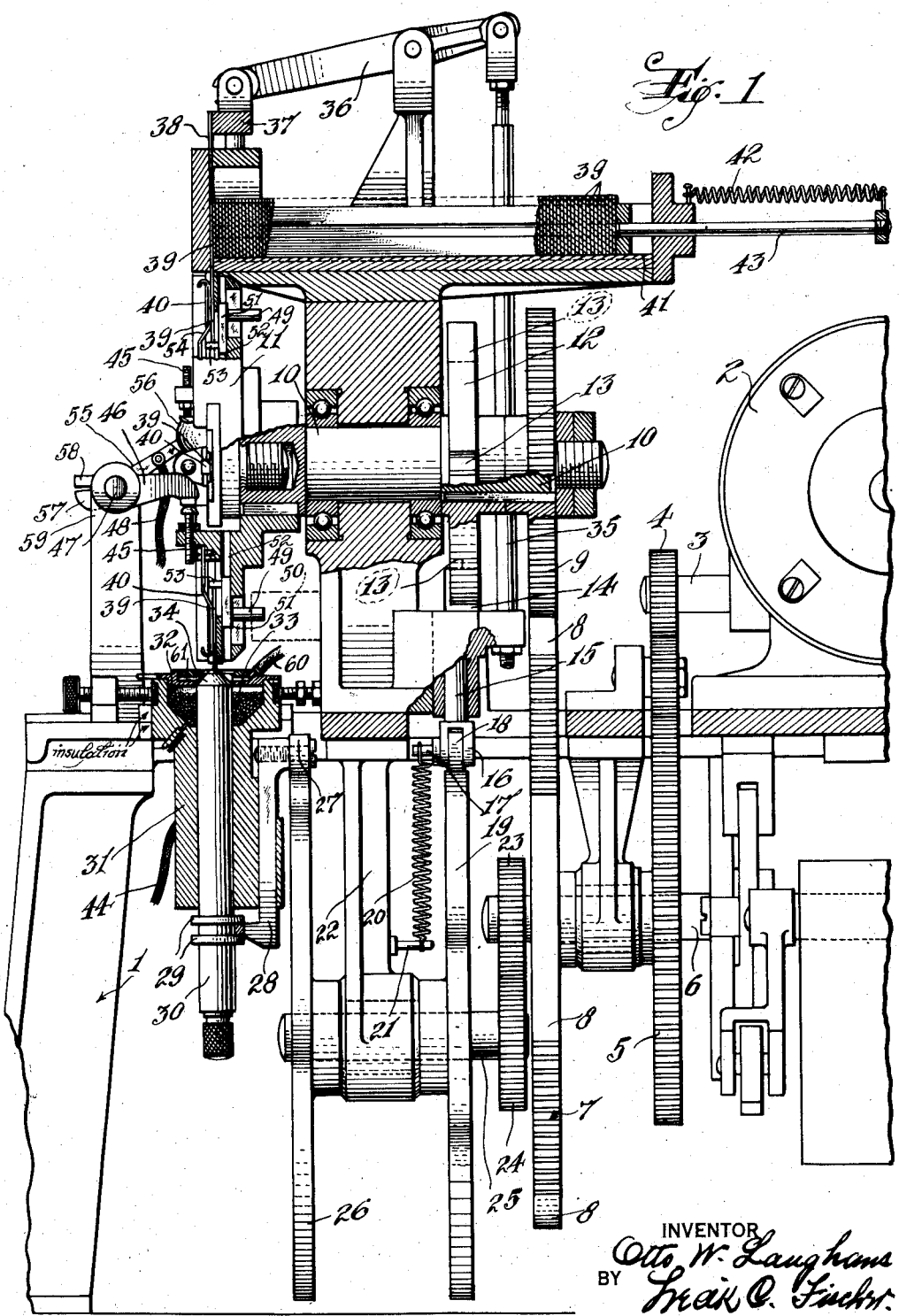

April 11, 1939.    O. W. LANGHANS    2,154,243
MACHINE FOR MAKING PEN POINTS
Filed March 14, 1938    3 Sheets-Sheet 2
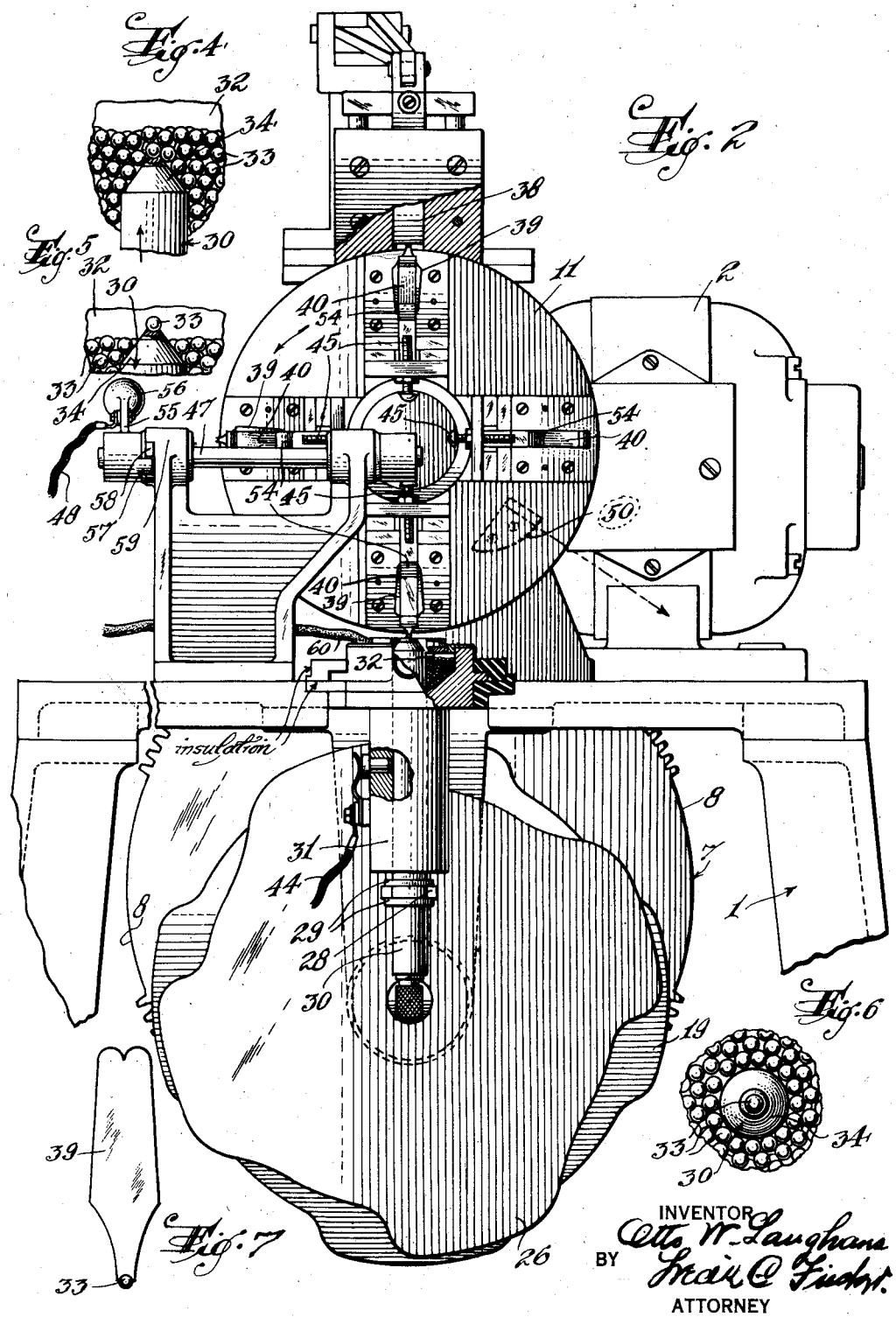

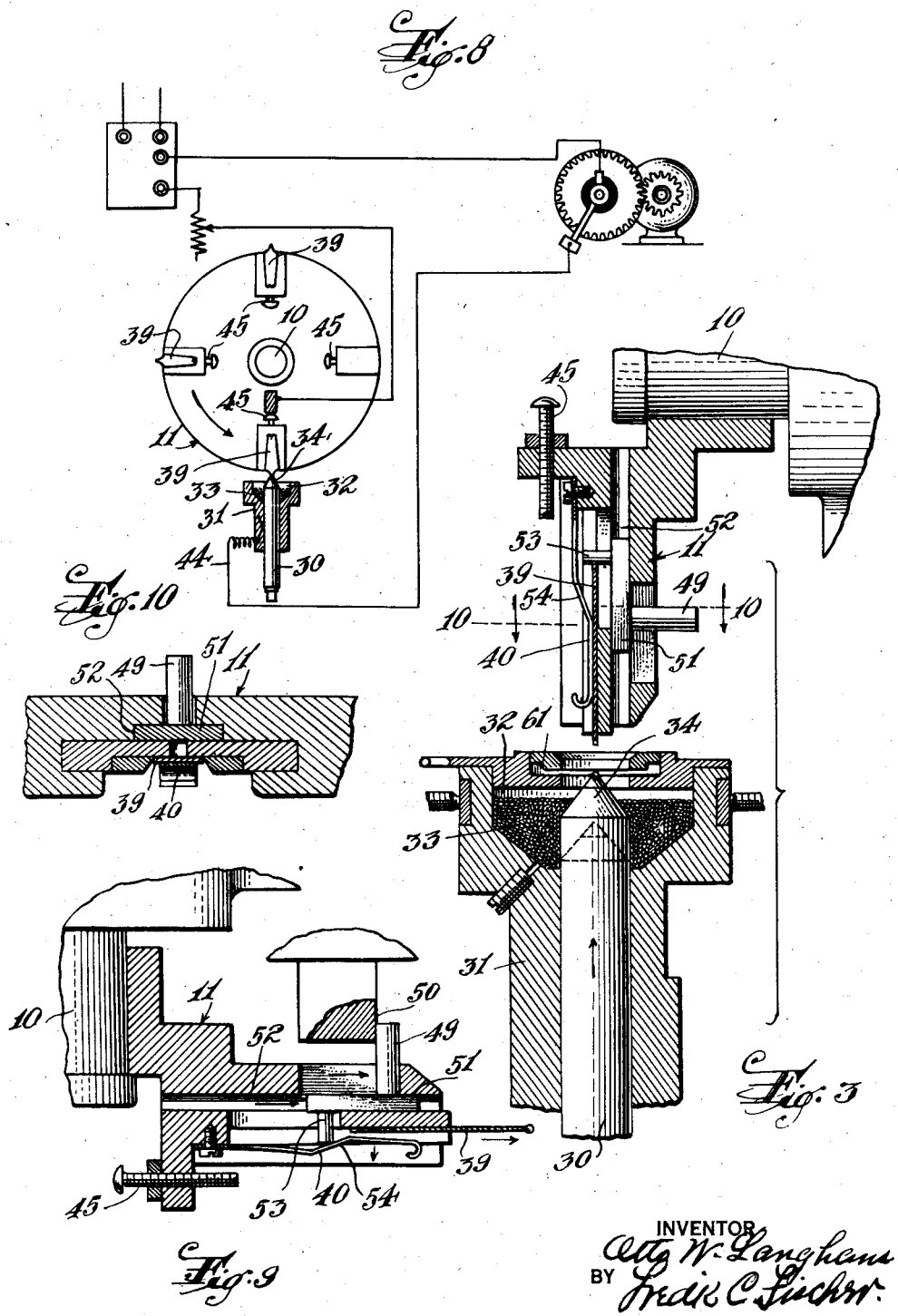

Patented Apr. 11, 1939

2,154,243

UNITED STATES PATENT OFFICE 2,154,243

MACHINE FOR MAKING PEN POINTS

Otto W. Langhans, Caldwell Township, Essex County, N. J., assignor to American Platinum Works, Newark, N. J., a corporation of New Jersey Application March 14, 1938, Serial No. 195,688

7 Claims. (Cl. 219—4)

This invention relates to machines for automatically attaching tips to pen point nibs.

In United States Letters Patent 2,080,140, issued May 11, 1937, there is described a device for welding electrically tips of iridium, or similar metal, to pen point nibs. While the method described in that patent is highly satisfactory, it is objectionable in that the operations are manual, and consequently slow and inconvenient.

It is an object of this invention to provide a machine for automatically feeding a pen point nib into position to receive a pen point tip, automatically electrically welding the tip to the nib, and subsequently automatically ejecting the completed pen point. By means of this machine, the manufacture of pen points is greatly speeded, thus materially decreasing the cost thereof.

A further object is the provision of a machine for automatically attaching iridium tips or the like to pen point nibs, which machine requires no attention except to from time to time replace the supply of nibs and tips.

These and other advantageous objects, which will later appear, are accomplished by the simple and practical construction and arrangement of parts hereinafter described and exhibited in the accompanying drawings, forming part hereof, and in which:

Fig. 1 is a side elevational view, partly in section, of a machine embodying the invention, Fig. 2 is a front elevational view of the machine shown in Fig. 1, Fig. 3 is a side elevational view, partly in section, showing details of the device for feeding tips into position to be attached to nibs, Fig. 4 is an elevational view of a feeding plunger in the process of selecting a tip, Fig. 5 is an elevational view of the feeding plunger after having selected a tip, Fig. 6 is a plan view of the feeding plunger with the tip in position thereon, Fig. 7 is a plan view of a pen point nib with a tip welded thereto, Fig. 8 is a diagrammatic view of the machine showing the electrical wiring connection, Fig. 9 is a sectional view showing details of an ejecting device used in the machine, and Fig. 10 is a sectional view taken on line 10—10 of Fig. 3.

Referring to Fig. 1 the machine is shown to comprise a base 1 upon which is mounted an electric motor 2 having a drive shaft 3 to which is attached a gear 4, in mesh with a large gear 5 mounted on the shaft 6. Also attached to shaft 6 is a gear 7 having spaces 8 without teeth, the gear 7 being in mesh with a gear 9 keyed to a shaft 10 which has also keyed thereto a turret 11. Also attached to the shaft 10 is a wheel 12 having four equally spaced notches 13 adapted to receive a holding pawl 14, attached to the upper end of a rod 15, the lower end thereof being forked at 16 and having journalled therein a shaft 17, upon which is mounted a roller 18, the latter being in engagement with a cam wheel 19. The rod 15 is normally maintained in a lowered position by the action of a tension spring 20 attached to a pin 21 projecting from a bracket 22 on the base 1.

The shaft 6 has attached thereto a gear 23 which is in mesh with a gear 24 fixed to a shaft 25 to which is also fixed the cam wheel 19 and a second cam wheel 26. The second cam wheel 26 engages a roller 27 on an arm 28 having the lower end thereof engaged between flanges 29 on the plunger 30, to intermittently raise and lower the latter.

The plunger 30 is slidably mounted in a housing 31 having the upper end thereof enlarged and expanded to provide a chamber 32 adapted to hold a quantity of tips 33 of iridium or similar metal. The upper end 34 of the plunger is conical and has a recess at the apex thereof adapted to hold only one tip 33 at a time.

Upward movement of the rod 15 also causes an upward movement of the rod 35 which has the upper end thereof attached to one end of a rocker arm 36, the other end of the rocker arm being connected to a block 37 having attached thereto a plunger plate 38, adapted to intermittently force a pen point nib 39 down onto the turret 11 where the nib is held in place by a spring clip 40.

The nibs 39 are stacked with the pointed ends thereof upward in a trough 41, and are constantly fed forward by the force of a spring 42 which urges a rod 43 to bear against the nibs 39.

Each nib 39 has the pointed end thereof provided with a recess to facilitate positioning of a tip therein during the welding process.

In operation, the turret is intermittently rotated by the action of the interrupted gear 8 and the detent 14 engaging in the notches 13 of the wheel 12. During each stop of the turret, a nib 39 is fed under the clip 40 in the upper portion thereof. At the same time the nib at the left hand side of the turret (see Fig. 2) is idle, while the nib at the lower portion of the turret is being welded to a tip. The cam 26 is so adjusted as to cause the plunger 30 to rise and properly position a tip in the recess in a nib in synchronism with the actions of the turret 11. The plunger is connected by means of a wire 44 to a source of electrical current, while the circuit is completed through the tip, nib, spring 40, screw 45 and rocker arm 46, which is attached to shaft 47, the latter being connected to the other terminal of the source of electric power by means of the wire 48.

The shaft 47 has attached thereto an arm 55 having a weight 56 at the end thereof, which tends to normally rotate the shaft 47 to move the arm 46 downward. However, downward movement is limited by the engagement of the end 57 of arm 55 with a stop 58 projecting from the bearing 59. The arm 46 is therefore maintained in position to engage the head of each screw 45 as the turret rotates to place a nib 39 in position to receive a tip.

When the nib with the tip welded thereto is moving to the right-hand side of the turret as shown in Fig. 2, a pin 49 engages a cam 50, which moves the pin outward (see Fig. 9). The pin 49 is attached to a plate 51 slidable in a groove 52 in the turret 11, and having a second pin 53 integral therewith. The second pin 53 engages the large end of a pen point nib and also the bent portion 54 of the spring clip 40. When the cam 50 moves the pin 49 and plate 51 outwardly, the pin 53 moves the spring clip 40 from contact with the nib 39 and also pushes the nib outwardly to eject the same from the turret, substantially along the dotted line in Fig. 2.

From the above description it will be seen that there has been provided a simple and convenient machine for automatically welding electrically tips to pen point nibs. The nibs are placed in the trough 41 and are automatically fed to the turret 11. Similarly, the tips are automatically fed in the proper position at the proper time to be welded to the nibs. These operations of the machine require practically no attention of an attendant, as the machine is of such simple structure as to insure accuracy of operation. The machine herein described is of considerable advantage in speeding the manufacture of pen points and decreasing the cost thereof. This is especially so when it is considered that the iridium tips welded to the nibs are very small and manual handling thereof would be extremely inconvenient and slow. By forming the plunger 30 with the conical upper portion provided with a recess at the apex thereof capable of holding only one tip at a time, proper positioning of the tip for welding purposes in the recess in the nib is assured.

During the welding operation, in order to prevent the formation of oxide on the tip, a stream of hydrogen is provided by means of a tube 60 directed into the space 61 surrounding the conical portion 34 of the plunger 30.

The foregoing disclosure is to be regarded as descriptive and illustrative only, and not as restrictive or limitative of the invention, of which, obviously, embodiments may be considered, including many modifications, without departing from the spirit and scope of the invention herein set forth and denoted in the appended claims.

Having thus described my invention what I claim as new and desire to secure by Letters Patent, is:

1. In a machine for automatically welding tips to pen point nibs, a turret, means on said turret adapted to hold a plurality of spaced nibs, a plunger having a conical upper end provided with a recess adapted to hold only one tip, means to move said plunger upwardly to position a tip in electrical contact with a nib, means for supplying electric current through the tip and nib, and means to automatically eject the nib from the turret after the tip has been welded thereto.

2. In a machine for welding electrically tips to pen point nibs, a turret, means for intermittently rotating the turret, means for stopping the turret at predetermined points, means on said turret adapted to hold a plurality of spaced nibs, means for automatically feeding pen point nibs to the turret, a plunger having a conical upper end provided with a recess adapted to hold only one tip, means to intermittently move said plunger upwardly to position a tip in electrical contact with a nib, and means for supplying electric current through the tip and nib.

3. In a machine for automatically welding tips to pen point nibs, a turret, means on said turret adapted to hold a plurality of spaced nibs, a plunger having a conical upper end provided with a recess adapted to hold only one tip, means to move said plunger upwardly to position a tip in electrical contact with a nib, and means for supplying electric current through the tip and nib.

4. In a machine for welding electrically tips to pen point nibs, a turret, a shaft to which said turret is attached, a gear fixed to said shaft, a member fixed to the shaft and having a plurality of spaced notches, an interrupted gear in mesh with said first mentioned gear, means for rotating said interrupted gear to cause intermittent rotation of said turret, a cam controlled detent adapted to be moved into said notches to stop the turret at predetermined positions, means on said turret adapted to hold a plurality of spaced pen point nibs, means for automatically feeding pen point nibs to the turret, a slidable plunger having a conical upper end provided with a recess adapted to hold only one tip, means to intermittently move the plunger upwardly to position a tip in electrical contact with a nib, and means for supplying electric current through the tip and nib to weld them together.

5. In a machine for automatically welding tips to pen point nibs, a turret, means on said turret adapted to hold a plurality of spaced nibs, a plunger having the upper end thereof provided with means adapted to hold only one tip, means to move said plunger upwardly to position a tip in electrical contact with a nib, means for supplying electric current through the tip and nib, and means to automatically eject the nib from the turret after the tip has been welded thereto.

6. In a machine for welding electrically tips to pen point nibs, a turret, means for intermittently rotating the turret, means for stopping the turret at predetermined points, means on said turret adapted to hold a plurality of spaced nibs, means for automatically feeding pen point nibs to the turret, a plunger having the upper end thereof provided with means adapted to hold only one tip, means to intermittently move said plunger upwardly to position a tip in electrical contact with a nib, and means for supplying electric current through the tip and nib.

7. In a machine for automatically welding tips to pen point nibs, a turret, means on said turret adapted to hold a plurality of spaced nibs, a plunger having the upper end thereof provided with means adapted to hold only one tip, means to move said plunger upwardly to position a tip in electrical contact with a nib, and means for supplying electric current through the tip and nib.

OTTO W. LANGHANS.